(12) United States Patent     (10) Patent No.:   US 12,687,341 B2

Kobayashi     (45) Date of Patent:    Jul. 21, 2026

(54) FUEL BLENDING IN THERMOCHEMICAL HEAT EXCHANGE METHODS

(71) Applicant: Hisashi Kobayashi, Bedford, NY (US)

(72) Inventor: Hisashi Kobayashi, Bedford, NY (US)

(73) Assignee: Praxair Technology, Inc., Danbury, CT (US)

( * ) Notice: Subject to any disclaimer, the term of this patent is extended or adjusted under 35 U.S.C. 154(b) by 410 days.

(21) Appl. No.: 18/473,392

(22) Filed: Sep. 25, 2023

(65) Prior Publication Data

US 2025/0102228 A1    Mar. 27, 2025

(51) Int. Cl.
| | |
|---|---|
| *F27D 17/00* | (2025.01) |
| *C03B 5/235* | (2006.01) |
| *C03B 5/237* | (2006.01) |
| *F27D 17/10* | (2025.01) |
| *F27D 17/13* | (2025.01) |

(52) U.S. Cl.
CPC ............ F27D 17/10 (2025.01); C03B 5/2353 (2013.01); C03B 5/237 (2013.01); *C03B 2211/40* (2013.01); *F27D 17/13* (2025.01)

(58) Field of Classification Search
CPC ....... C03B 5/2353; C03B 5/237; C03B 3/023; C03B 2211/60; F23C 9/00; F23L 7/007; Y02E 20/34; F27D 17/10; F27D 17/13
See application file for complete search history.

(56) References Cited

U.S. PATENT DOCUMENTS

| | | | |
|---|---|---|---|
| 6,113,874 A | 9/2000 | Kobayashi | |
| 2015/0308685 A1* | 10/2015 | Iyoha ..................... | F23L 15/02 |
| | | | 431/11 |
| 2018/0201853 A1* | 7/2018 | Kobayashi ............... | C01B 3/34 |
| 2018/0283789 A1* | 10/2018 | Kobayashi ............. | C03B 5/237 |
| 2018/0346365 A1* | 12/2018 | Kobayashi ........... | C03B 5/2353 |

FOREIGN PATENT DOCUMENTS

| | | |
|---|---|---|
| EP | 3604923 A1 | 2/2020 |
| WO | 2023047346 A1 | 3/2023 |

OTHER PUBLICATIONS

James McAndrew et al., Advances in Glass Industry Energy Savings Using Heat Oxycombustion, Glass Problems Conference, Nov. 2022.

Y.Wang and H. Kobayashi, "Dilute Oxygen Combustion", Phase II final report to US Department of Energy, DOE/ID/1331-2, Sep. 2005.

D. Trommer, et.al., "Kinetic investigation of the thermal decomposition of CH4 by direct irradiation of a vortex-flow laden with carbon particles", International Journal of Hydrogen Energy 29 (2004) 627-633.

* cited by examiner

*Primary Examiner* — Ko-Wei Lin

(74) *Attorney, Agent, or Firm* — Andrew G. Melick

(57) ABSTRACT

Disclosed is a thermochemical regenerative combustion method in which a mixture of fuel components that can, and cannot, undergo endothermic reaction is passed through a heated regenerator to obtain improved heat recovery efficiency.

26 Claims, 4 Drawing Sheets

FUEL BLENDING IN THERMOCHEMICAL HEAT EXCHANGE METHODS

FIELD OF THE INVENTION

The present invention relates to a novel process for the reduction of fuel consumption and $CO_2$ emissions from combustion processes by blending hydrogen and other $CO_2$ neutral fuels generated from biomass, with hydrocarbon fuels, to create a blended fuel mixture that improves efficiency of heat recovery from high temperature flue gas from furnaces such as glass melting furnaces, wherein glassmaking material is fed into the furnace and is heated and/or melted by the heat of combustion of the blended fuel mixture and oxidant that occurs within the furnace.

BACKGROUND OF THE INVENTION

Many industrial processes such as glass manufacture require establishing and maintaining high temperatures within a furnace or other similar equipment. Often, the high temperature is established by combustion of a fuel, such as hydrocarbon fuels, as a means of supplying heat and energy for various process needs. Typically, a hydrocarbon fuel is combusted with an oxidant to release the fuel's chemical energy, thereby forming single or multiple high temperature flames within the furnace. Heat from the flame is transferred to process loads for a variety of purposes, such as to produce high pressure steam for electricity generation or to melt raw materials for making glasses and metals.

This combustion generates high temperature flue gas streams. Since combustion of conventional fossil fuels such as natural gas and oil emit large amounts of $CO_2$ as part of a flue gas or flue gas stream, new combustion technologies to partially or fully replace fossil fuels with $CO_2$ neutral fuels are currently being developed. For reasons of efficiency and economy, it is highly desirable to recover and utilize the heat content of these flue gas streams, rather than simply venting the flue gas streams to the external ambient atmosphere. In this regard, a number of technologies have been developed to recover and utilize this heat, typically using counter-current heat exchangers to transfer heat from a hot gas stream (e.g., flue gas streams) to a cold gas stream (e.g., oxidant or fuel stream). For example, both recuperators and regenerators are widely used to preheat combustion air streams by transferring heat from hot flue gas streams. The theoretical maximum heat recovery is achieved when the combustion air is heated to the same temperature as that of the flue gas entering the heat exchanger. However, for most combustion processes, the heat capacity rate of the hot flue gas stream is much greater than that of the combustion air stream, thereby limiting the theoretical maximum heat recovery rate from the flue gas stream by preheating the combustion air stream. The heat capacity rate is typically defined as the heat capacity of a gas stream multiplied by the mass flow rate of the gas stream. In oxy-fuel combustion processes, in which industrial pure oxygen or oxygen enriched air is used as the oxidant for combustion, the heat capacity rate ratio of the flue gas stream to the oxidant stream becomes much larger in comparison to the combustion process using air as the oxidant, and the theoretical maximum heat recovery from the flue gas by oxygen preheating alone becomes less than 50%.

Alternatively, combined heating of both oxidant and fuel streams in two separate heat exchangers is practiced in some high temperature furnaces using oxy-fuel combustion to increase heat recovery from the flue gas stream. However, the currently available metallic recuperators are capable of heating oxygen to about 600° C. and natural gas to about 450° C., resulting in recovery of less than 30% of the sensible heat available in the flue gas stream at about 1400° C. to 1500° C. from glass melting furnaces. (Reference: LIFE07 ENV/F/000179, LIFE 3.0-LIFE Project Public Page (europa.eu))

Another option to improve heat recovery from the flue gas stream is usage of a thermochemical heat exchanger. In the thermochemical heat exchanger, the sensible heat of a high temperature stream is transferred to a low temperature stream and, more specifically, the sensible heat content is converted as both thermal and chemical energy to the low temperature stream utilizing endothermic chemical reactions. When endothermic chemical energy is added, the effective heat capacity rate of the low temperature stream becomes much larger and the heat recovery efficiency is improved substantially. One technology, referred to as thermochemical regeneration and described in Applicant's U.S. Pat. No. 6,113,874, which is incorporated herein by reference in its entirely for all purposes. U.S. Pat. No. 6,113,874 relates to alternatingly passing hot flue gas through a first regenerator to heat the first regenerator, and then passing the resultant cooled flue gas mixed with reforming fuel (e.g., typically, natural gas) through a second regenerator which has been heated in a previous step by passing the hot flue gas through it. The mixture of the reforming fuel and the combustion products such as $CO_2$ and $H_2O$ in the flue gas react endothermically in the second regenerator, utilizing heat that had been previous stored in the second regenerator, to produce a syngas mixture containing CO and $H_2$, which can include soot, and which is then passed out of the second regenerator and into the furnace where it is combusted.

While a thermochemical heat exchanger can transfer a large amount of sensible heat from a high temperature stream to a low temperature stream by utilizing endothermic chemical reactions in the low temperature stream, this mode of heat exchange is limited to the temperature zone where the endothermic chemical reactions can procced at a sufficient rate. High gas temperature, long gas residence time and large heat exchanger surface area are important parameters to accelerate endothermic chemical reactions in the heat exchanger. Thermochemical heat exchangers are designed by the conventional method considering the temperature and the gas residence time required to achieve desired heat transfer and endothermic chemical reactions. In a laboratory test to study non-catalytic reforming reactions of natural gas with water vapor and carbon dioxide, minimal reactions took place below 1800° F. (982° C.) with gas residence time of less than 90 millisecond. (Y. Wang and H. Kobayashi, "Dilute Oxygen Combustion", Phase II final report to US Department of Energy, DOE/ID/1331-2)

Thermal cracking of natural gas to form carbon and hydrogen is endothermic and can be used in a non-catalytic thermochemical heat exchanger without introducing water vapor and carbon dioxide required for reforming reactions. Although significant cracking reactions can occur at temperatures below 500 C, the rate is controlled by the residence time available in the heat exchanger. In a laboratory test, only about 20% of the methane was converted to carbon at a gas residence time of about 1 second at 900° C. (D. Trommer, et. al., "Kinetic investigation of the thermal decomposition of $CH_4$ by direct irradiation of a vortex-flow laden with carbon particles", International Journal of Hydrogen Energy 29 (2004) 627-633). For practical thermochemical heat exchangers using natural gas reforming reactions, a flue gas stream above 1000° C. and a high temperature heat exchanger zone above 900° C. are recommended.

While this thermochemical regeneration technology is useful and provides highly desirable economies to the operator, the enhanced heat recovery achieved by using endothermic reactions is limited to the heat exchanger zone typically above 900° C. when natural gas is used as the fuel. In the lower temperature zone, a minimal amount of endothermic reactions occur, and the heat recovery is limited by the low heat capacity rate ratio of the low temperature stream (e.g., natural gas) to the high temperature stream (e.g., flue gas). Although U.S. Pat. No. 6,113,874 teaches the use of catalysts to lower the temperature zone at which endothermic reactions occur, a tendency for possible fouling of catalyst by contaminants in the flue gas from industrial furnaces can make it impractical in the direct contact regeneration technology. In view of the aforementioned drawbacks, there remains a need to find improvements in the efficiency, economy, and heat recovery, that can be realized, especially by utilizing $CO_2$ neutral fuels. The present invention feeds this need.

BRIEF SUMMARY OF THE INVENTION

One aspect of the present invention is a method of operating a furnace at a specified production rate, comprising:

(A) producing gaseous combustion products by combusting in the furnace a fuel product, wherein the fuel product is produced in a heat exchanger by (B) (i) feeding into the heat exchanger a fuel mixture which comprises an amount of a first fuel and an amount of a second fuel, and (ii) endothermically reacting the fuel mixture in the heat exchanger to form the fuel product, and (iii) passing said gaseous combustion products from the furnace into and through the heat exchanger to provide heat to the endothermic reaction that forms the fuel product; and (C) feeding the fuel product from the heat exchanger into the furnace to be combusted, under conditions to maintain the specified production rate wherein the amount of heat transferred in the heat exchanger from the gaseous combustion products to the fuel mixture relative to the amount of heat contained in the gaseous combustion products is higher than a fuel input weighted average heat exchanger efficiency of the fuel mixture.

A second aspect of the present invention is a method of carrying out combustion in a furnace, comprising"

(A) combusting a fuel product in a furnace to produce gaseous combustion products, and (B) passing the gaseous combustion products from the furnace into a heat exchanger to transfer heat from said gaseous combustion products to a fuel mixture comprising (i) a first fuel that undergoes endothermic reactions with a heat recovery potential above 900° C. of greater than 100% and (ii) a second fuel that has a larger heat recovery potential below 900° C. than that of the first fuel, thereby cooling said gaseous combustion products and heating said fuel mixture to form said fuel product, and passing said fuel product into the furnace and combusting said fuel product in the furnace.

A third aspect of the present invention is a method of carrying out combustion in a furnace, comprising:

(A) combusting a fuel product in a furnace to produce gaseous combustion products, and (B) alternately (1) passing the gaseous combustion products from the furnace into and through a cooled first regenerator to heat the first regenerator and cool said gaseous combustion products, and passing a fuel mixture comprising (i) one or more compounds that cannot react endothermically at a temperature below 1500 C and (ii) one or more compounds that can react endothermically at a temperature below 1500 C, into a heated second regenerator heated in step (2) and, in the second regenerator, heating said one or more compounds that cannot react endothermically at a temperature below 1500 C and said one or more compounds that can react endothermically at a temperature below 1500 C to form said fuel product comprising hydrogen, thereby cooling said second regenerator, and passing said fuel product from the second regenerator into the furnace and combusting the fuel product in the furnace, and (2) passing the gaseous combustion products from the furnace into and through said cooled second regenerator to heat the second regenerator and cool said gaseous combustion products, and passing a fuel mixture comprising a mixture of (i) one or more compounds that cannot react endothermically at a temperature below 1500 C and (ii) one or more compounds that can react endothermically at a temperature below 1500 C, into a heated first regenerator heated in step (1) and, in the first regenerator, heating said one or more compounds that cannot react endothermically at a temperature below 1500 C and said one or more compounds that can react endothermically at a temperature below 1500 C, wherein the one or more of said compounds that can react endothermically at a temperature below 1500 C reacts in an endothermic reaction to form said fuel product comprising hydrogen, and passing said fuel product from the first regenerator into the furnace and combusting the fuel product in the furnace.

In an optional embodiment, the furnace may be co-fired with other burners, wherein each of said other burners uses a corresponding fuel that is different from said fuel product.

DETAILED DESCRIPTION OF THE INVENTION

Figure 1:
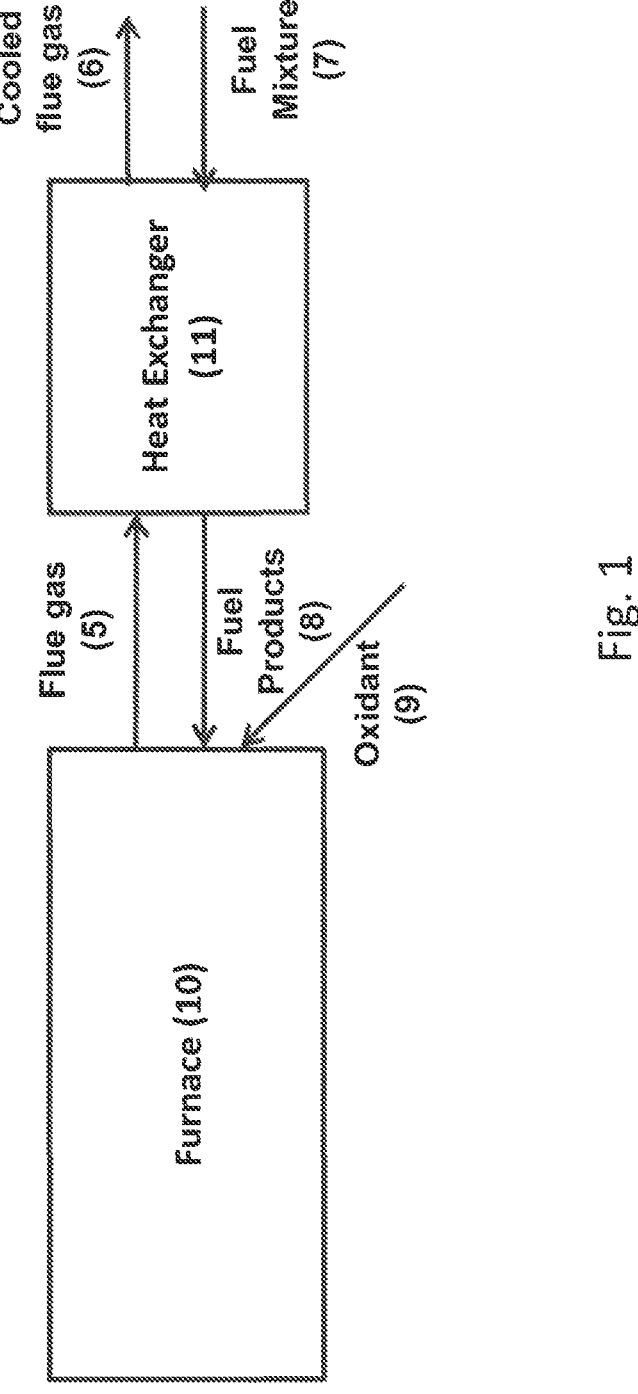
FIG. 1 is a generalized schematic representation of one aspect of the heat recovery process of the present invention.

The present invention employs a thermochemical heat recovery process. The thermochemical heat recovery process can be generally described with reference to FIG. 1, which illustrates a heat recovery heat exchanger that is operably connected to a high temperature combustion chamber such as a glass melting furnace, a steel reheat furnace or a cement kiln. Combustion takes place in furnace (10) by injecting oxidant (9) and fuel products (8) formed by thermochemical reactions in counter-current heat exchanger (11). Flue gas (5) is produced that exits furnace (10) at a high temperature and enters the heat recovery heat exchanger (11). The flue gas (5) may also contain other gases generated from materials heated or melted in the furnace (10). A fuel mixture stream (7) ("FM") containing two different fuels is fed into the heat recovery heat exchanger (11) as the low temperature stream which is utilized to recover heat from the high temperature flue gas stream (5) from the furnace (10). As will be shown hereinbelow, careful selection of the two different fuels (f1 and f2) to create the fuel mixture stream (7) have been discovered by the inventors to provide a synergistic effect to enhance heat recovery efficiency relative to other heat recovery processes discussed hereinabove. Air, enriched air, or oxygen can be used as oxidant (9) in the present invention. The counter-current heat exchanger (11) is preferably either a recuperator which transfers heat continuously through heat transfer surfaces (e.g., walls) separating two heat exchanging streams or regenerators (e.g., checker-filled regenerators) which store heat in heat storage media, typically refractory bricks, to transfer heat from the high temperature flue gas stream (5) and then transfer heat from the heat storage media to the low temperature fuel mixture stream (7) in a cyclic fashion.

Examples of combustion processes with which the method of the present invention can be practiced include, but are not limited to, oxy-fuel fired glass melting furnaces, in which glass-forming ingredients are melted together to form molten glass. In a preferred embodiment of the present invention, an oxy-fuel fired glass melting furnace with two thermochemical regenerators is used as will be explained in conjunction with FIGS. 2-4.

This heat recovery process proceeds in two cycles, which are referred to herein as the flue cycle and the reforming cycle. These two cycles are performed alternatingly in two or more checker-filled regenerators. The heat recovery process is preferably carried out in association with furnaces and other combustion devices which employ "oxy-fuel" combustion processes, i.e. combustion of fuel with gaseous oxidant comprising an oxygen content of at least 50 vol. % oxygen, and preferably at least 80 vol. % oxygen, more preferably at least 90 vol. % oxygen, and most preferably at least 99 vol. % oxygen, because the flue gases produced by oxy-fuel combustion have higher $H_2O$ and $CO_2$ concentrations, both of which promote the endothermic reforming reactions that can be utilized in the method of the present invention. During the flue cycle, the checkers in a first regenerator extract stored heat from a high temperature flue gas stream which is fed from the furnace into and through this first regenerator.

In the reforming cycle, FM enters the second regenerator in which the checker has already been heated, as described herein, and flows through it towards the furnace. The FM may include a portion of the cooled flue gas, termed recycled flue gas (RFG), that exits the first regenerator and is then fed into the second regenerator. The temperature of the FM passing through the second regenerator continues to increase by extracting heat from the already pre-heated checker. As the FM passes through the second regenerator, it reaches a temperature at which reforming reactions begin to occur and continue to occur, producing fuel products (e.g., including $H_2$ and CO when the FM comprises natural gas and hydrogen). The reforming reactions are endothermic and the heat needed to promote the reforming reactions is absorbed from the pre-heated checker. The gaseous composition that is produced by the reforming reactions (i.e., the fuel products) typically comprises one or more components such as $H_2$, CO, unreacted gases comprising $H_2O$, $CO_2$, $CH_4$, nitrogen, optionally residual $NO_x$, and soot, whereby the exact fuel products depend upon the FM that is utilized. The gaseous composition thus produced may also be called "syngas" herein when the fuel products comprise at least $H_2$ and CO. The syngas emerges from the second regenerator into the furnace and is combusted in the furnace with oxidant to provide thermal energy for heating and/or melting material in the furnace.

After a length of time, the operation of the two regenerators is reversed, i.e., the first regenerator that was used in the flue cycle is switched to the reforming cycle, and the second regenerator that was used in the reforming cycle is switched to the flue cycle. After a further period of time, the operation of the two regenerators is reversed again. The timing of the reversals can be determined by elapsed time, or by other criteria such as the temperature of the flue gas exiting from the first regenerator that is in flue cycle. The reversal process is preferably carried out according to a predetermined mechanism and plan, wherein valves are sequenced to open and close based on specific timings.

The operation and control of the above described preferred embodiment of the present invention is described in greater detail below in conjunction with FIGS. 2 to 4. An end-port fired glass furnace (10) fitted with two regenerators in end wall (3) is used as an example. However, it should be understood that any configuration of the regenerators can be utilized. For example, the operation described herein of a pair of regenerators can be carried out in the same manner when the pair of regenerators are side by side on one side of furnace (10) or are positioned on opposite sides of the furnace (10).

Figure 2:
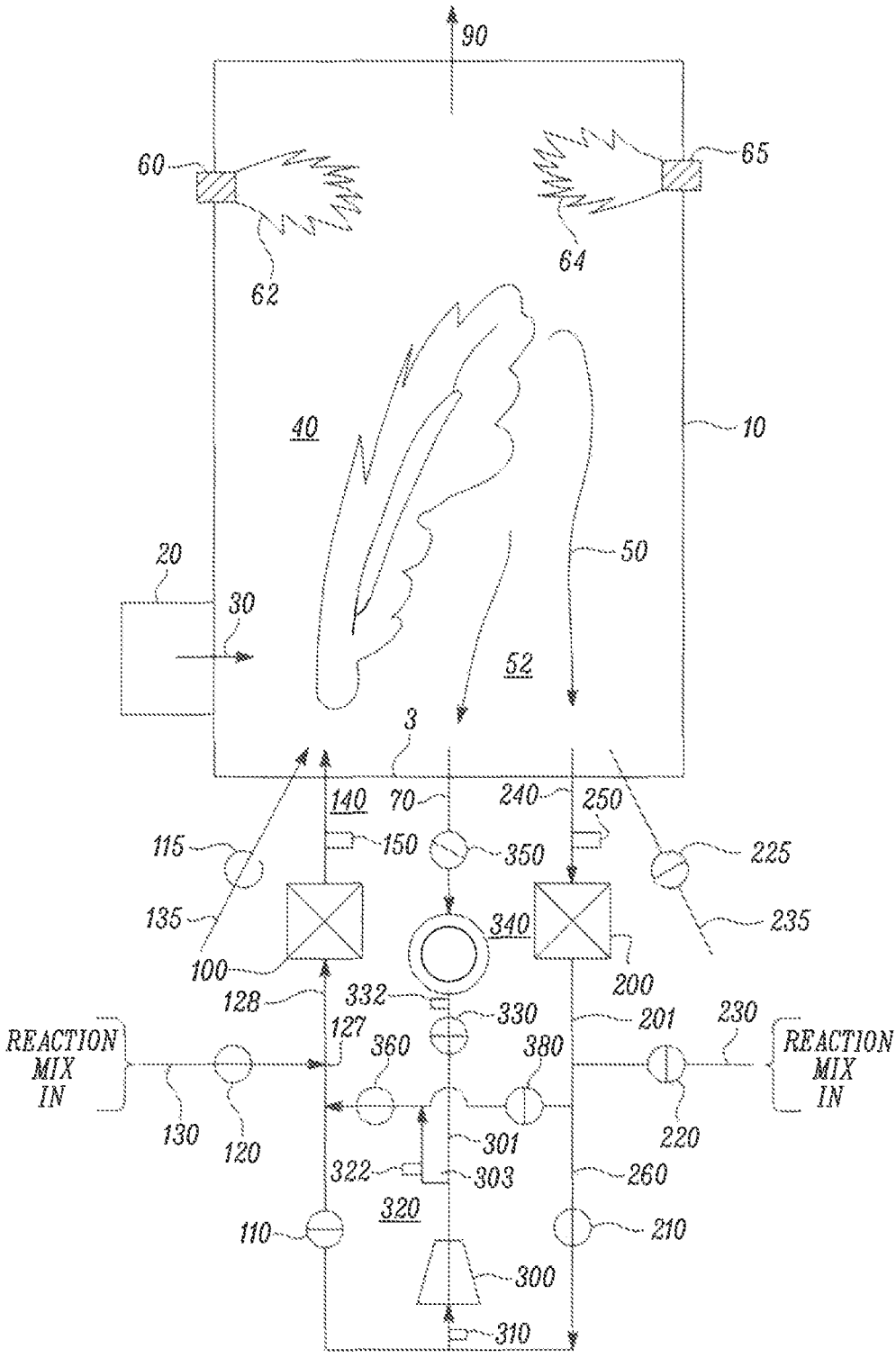
FIG. 2 is a process flow schematic of an oxy-fuel fired glass melting furnace with two thermochemical regenerators that alternate to receive a fuel mixture in accordance with the principles of the present invention.

As shown in FIG. 2, end-port glass furnace (10) has a feed station (20) where feed material (30) comprising solid glassmaking materials (known as batch and/or cullet) are charged into the furnace (10) to be heated and melted. The flow of molten glass out of furnace (10) is represented as (90). The furnace (10) is equipped with first regenerator (100) on the furnace left side and second regenerator (200) on the furnace right side. Vertical cross-sectional views of the two regenerators (100) and (200) are displayed in more detail in FIGS. 3 and 4.

Figure 3:
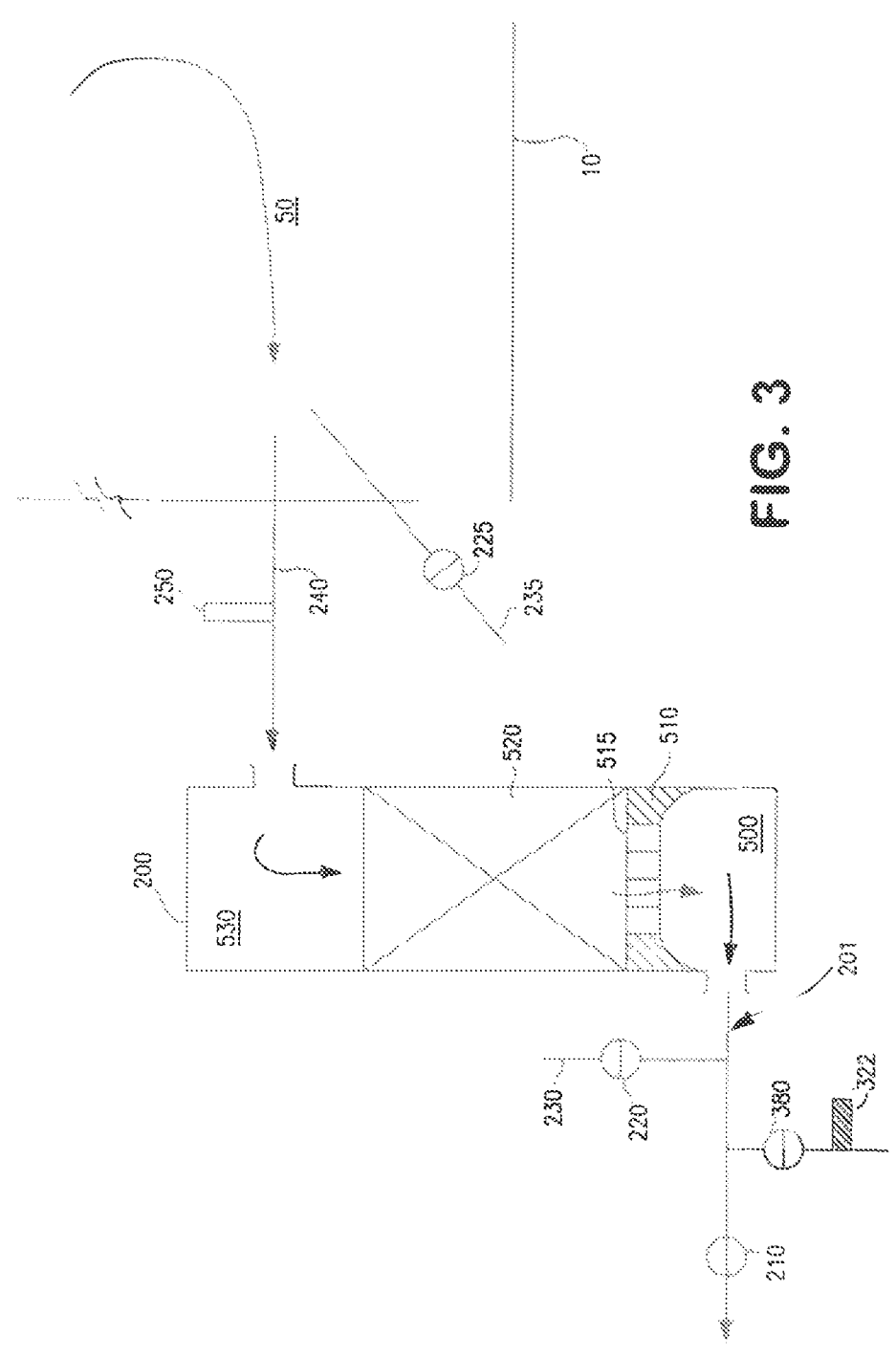
FIG. 3 shows one of the regenerators of FIG. 2 operating in a flue cycle mode to accumulate heat in accordance with the principles of the present invention.

As seen in FIG. 3, second regenerator (200) is in the flue cycle wherein flue gas stream (50) from the interior of furnace (10) enters port neck (240) and then flows past an optional oxygen analyzer (250) and then into the top space (530) of second regenerator (200). The flue gas stream (50) heats checkers (represented as (520)) as it flows through passages between the checkers within second regenerator (200), and enters chamber bottom space (500) through gas passages (515) supported on arch (510) which also supports the weight of the whole bed of checkers (520). As seen in FIG. 2, a portion (52) of the flue gases produced in furnace (10) may be by-passed to conduit (70) (for instance, if it is desired to control the regenerator from becoming too hot) through a partially opened valve (350) and then enters stack (340) to exhaust, by which is meant that it does not re-enter the furnace (10), but instead is discharged to the atmosphere and/or conveyed to one or more other stations for storage and/or further treatment or any combination of such destinations. For maximum heat recovery, it is preferred that valve (350) is closed so that essentially all the furnace flue gas goes to second regenerator (200) as flue gas stream (50).

As seen in FIGS. 2 and 3, the cooled flue gas stream (201) exits the second regenerator (200) in conduit (260), passes through an open valve (210) and oxygen sensor (310), and then enters the suction-side of blower (300). The majority of the flue gas (301) leaving the pressure-side of the blower passes through a damper (330) then a flow meter (332), and finally is directed into stack (340) through which this cooled flue gas leaves the system to exhaust as defined herein.

Figure 4:
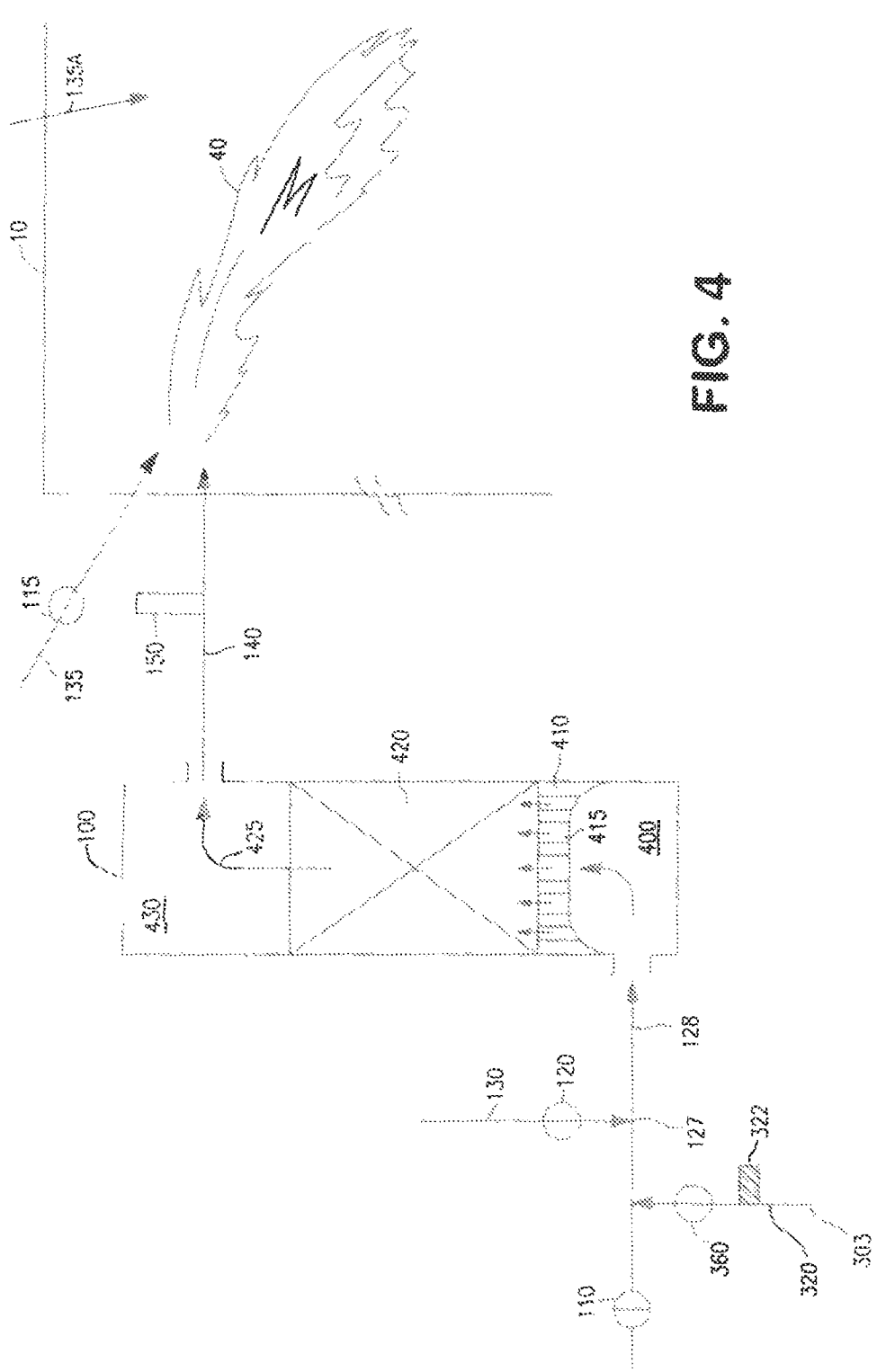
FIG. 4 shows the other regenerator of FIG. 2 operating in a reforming cycle whereby a fuel mixture is fed into the regenerator in accordance with the principles of the present invention.

Referring to FIGS. 2 and 4, if desired, a portion (303) of the cooled flue gas can be recycled to the bottom of first regenerator (100) by passing through conduit (320) and valve (360) which is in the open position. This creates Recycled Flue Gas (RFG). Its flow is metered by a flow meter (322) as can be more clearly seen in FIG. 4. The RFG can be combined with FM from stream (130) which intersects and mixes with the RFG at location (127) in conduit (128), which communicates with the bottom space (400) of first regenerator (100). In this cycle of the operation, FM which is to be fed to the first regenerator (100) is supplied by a conduit (130) through valve (120).

As seen in FIG. 4, the FM enters the already pre-heated checker pack (420) of first regenerator (100) through gas passages (415) on arch (410). First regenerator (100) has already been heated in a previous cycle by passage of flue gas from the furnace (10) into and through the first regenerator (100). The temperature of the FM increases as it flows through the pre-heated checker pack (420) of first regenerator (100). When the temperature of the FM reaches reforming temperature, endothermic reforming reactions occur in which the components of the FM which can undergo endothermic reaction react and form CO, H2, other species, and possibly some soot. The required heat for the endothermic reforming reactions is taken from the pre-heated checker pack (420). The reforming reaction continues as the FM continues to travel toward the top space (430). The syngas stream (425) (referred to herein interchangeably as a "reformed" or "syngas" gas stream) exits from the top of checker pack (420) of first regenerator (100). Syngas stream (425) has a high temperature and exits pre-heated checker pack (420) at temperatures ranging from 1800 F to 2500 F by way of non-limiting example. The syngas stream (425) has a composition that includes species such as CO, H2, soot, unreacted CH4, and unreacted CO2 and H2O. FIG. 2 shows that the syngas stream (425) passes through port neck (140) and optional oxygen sensor (150) and enters furnace (10). This syngas stream (425) is combusted in the furnace (10) and is represented as flame (40) to generate additional heat of combustion useful for heating and/or melting material in the furnace (10), such as glassmaking materials. Oxidant required for combustion of the syngas stream (425) is supplied by a conduit (135) through opened valve (115). This oxidant can be air, or it can have an oxygen content higher than that of air, i.e., at least 21 vol. %, and preferably equal to or higher than 80 vol. %, more preferably equal to or higher than 90 vol. %, and most preferably at least 99 vol. %.

Typically, the heat recovery process proceeds with one regenerator in the flue cycle and one regenerator in the reforming cycle, as seen in FIG. 2, for about 20 to 40 minutes, by way of non-limiting example, or until the checkers in the reforming regenerator are too cold to provide sufficient heat to promote the desired endothermic chemical reactions. At that point, and now continuing with the description herein where second regenerator (200) is in the flue cycle and first regenerator (100) is in the reforming cycle (as shown in FIG. 2), furnace (10) undergoes a reversal in which second regenerator (200) is transitioned to the reforming cycle for heat recovery and first regenerator (100) is transitioned into the flue cycle for heat accumulation. Before the reversal occurs, any remaining syngas produced in first regenerator (100) is purged with RFG into furnace (10). In this regard, reforming fuel FM supplied to the first regenerator (100) is terminated by closing valve (120), while letting the flow of RFG from blower (300) continue. Remaining syngas in first regenerator (100) is purged by the RFG for a specified amount of time so that nearly all the syngas in the first regenerator (100) is expelled to the furnace (10) and combusted to completion.

After the remaining syngas is purged from first regenerator (100), reversal occurs such that first regenerator (100) operates in a flue cycle mode and the second regenerator (200) operates in a reforming mode. Upon reversal, the flue gas from the furnace (10) passes through first regenerator (100), and a portion thereof passes to exhaust (as defined hereinabove), while a portion or the balance may be mixed with FM and the resulting mixture is passed through regenerator (200) and into the furnace. Referring to FIG. 2, valve (110) which had been closed is opened, valve (210) is closed, and valve (360) is closed and valve (380) is opened, if it is desired to permit heated flue gas to pass from first regenerator (100) toward and through blower (300), and to permit a portion (303) of this flue gas to pass into second regenerator (200) after it is mixed with FM (230) which enters through valve (220) which had been closed but now is opened. Valve (115) which had been open is closed, as no combustion aided by oxidant through valve (115) occurs in this phase, and valve (225) is opened. The FM or a mixture of FM and RFG undergoes in regenerator (200) the endothermic reactions which had occurred in regenerator (100) in the previous cycle as described hereinabove, to produce syngas (425) which passes into furnace (10) where it is combusted with oxidant (235) that is fed through valve (225). Before reversal occurs such that first regenerator (100) once again operates in the reforming cycle mode and the second regenerator (100) once again operates in the flue cycle mode, any remaining syngas produced in second regenerator (200) is purged with RFG into furnace (10) in the same manner described hereinabove.

The Fuel Mixture (FM)

The fuel mixture (FM) comprises a defined amount of a first fuel and a defined amount of a second fuel. Each fuel may contain multiple fuel compounds. For example, natural gas typically contains many hydrocarbon species. It should be understood that the term "first fuel" and the term "second fuel" as used herein and throughout is intended to mean each of the first and second fuel can comprise one or more fuel species or compounds. The first fuel ("f1") is characterized as a fuel that comprises one or more compounds that can react endothermically at a temperature below 1500° C. The second fuel ("f2") is characterized as a fuel that can comprise one or more fuel species or compounds and has a heat capacity rate ratio to its own gaseous combustion products that is greater than the heat capacity rate ratio of the first fuel to its own gaseous combustion products in the temperature zone below the zone in which the endothermic reactions of the first fuel start; the second fuel f2 in this zone does not incur any significant endothermic reactions and is designated as the Low Temperature Zone or "LTZ". The heat capacity rate of a gas stream is defined as the heat capacity of the gas stream multiplied by the mass flow rate of the gas stream. The heat capacity rate ratio is a ratio of the heat capacity rate of a gas stream to the heat capacity rate of another gas stream. The effective heat capacity rate ratio of the first fuel to its own gaseous combustion products above the LTZ, which is designated as the High Temperature Zone ("HTZ"), is greater than one. The effective heat capacity rate of a reactive gas stream (f1) is defined as the enthalpy change of f1 which includes both thermal and chemical energy in the HTZ divided by the temperature change of f1 in HTZ. This effective heat capacity rate ratio of f1 in the HTZ which is greater than one means that the gaseous combustion products of f1 does not have a sufficient heat capacity rate in the HTZ to heat and fully complete the endothermic reactions of f1 in the HTZ.

Non-limiting examples of the first fuel include natural gas, ammonia, alcohol, and pyrolysis gases and liquids from biomass. Non-limiting examples of compounds that are in the first fuel include saturated and unsaturated hydrocarbons containing 1 to 4 carbon atoms (such as methane, ethane, propane, n-butane, isobutane, ethylene, propylene, and butylene), ethanol, acetic acid, NH3, H2S, and mixtures thereof. Non-limiting examples of the second fuel include hydrogen, ethanol, syngas, blast furnace gas. Non-limiting examples of compounds that are in the second fuel f2 include hydrogen, carbon monoxide, carbon, sulfur, water, carbon dioxide, nitrogen, and mixtures thereof.

The FM can be formed by mixing together the first and second fuels. Each of these fuels can be obtained commercially, typically in a storage vessel, such as tanks or pressurized cylinders. One or more valves can be used to turn on and turn off flow of e gas from the storage vessel and regulate flow out of the storage vessel. Alternatively, the FM can also be formed in a remote location and delivered via pipelines to the use points.

PROPHETIC EXAMPLES

Table 1 shows various examples of furnace energy balances and heat transfer analyses for a 300 tpd container glass furnace with a melter area of 100 m2, operating with 50% cullet ratio and 1000 kW electric boosting. Cullet is recycled glass used as a feed material and 50% of glass produced is made from cullet. Case numbers 2, 4, 5, 6 and 7 are calculated with a thermochemical regenerator system ("TCR") for flue gas heat recovery and case numbers 1 and 3 are not calculated using a TCR system. The furnace energy balances and heat exchanger heat transfer analyses are performed using a detailed glass furnace energy balance model and a counter current heat exchanger model created by the inventors. The predictions from these models have been shown to agree well with actual industrial furnace data using natural gas and a TCR and therefore serve as a reliable indicator of actual/projected results of the present invention. Cases 1 and 3 show oxy-fuel firing cases without using TCR in which all of the flue gas leaves the furnace at 1445° C. (i.e., no portion of the hot flue gas is recycled). Calculated fuel consumptions are 3.52 GJ/t with natural gas ($CH_4$ for case number 1) and 3.53 GJ/t with hydrogen ($H_2$) for case number 3, i.e., about the same fuel consumption. Natural gas is modelled as pure methane ($CH_4$). The oxidant used for combustion is industrial oxygen with 93% 02 purity. Case 2 shows the same furnace fired with $CH_4$ and utilizing 93 vol % oxygen as the oxidant and operated with a TCR heat recovery system at the RFG to $CH_4$ flow ratio of 1. The heat transfer analysis of the TCR shows 51.6% of the sensible heat in the flue gas is transferred to the fuel (i.e., RFG-$CH_4$ mixture), which is recycled to the furnace as the sensible heat and chemical energy of the syngas formed. 8.2% of the sensible heat in the flue gas is lost as wall heat losses. The remaining 40.2% of the sensible heat exits the TCR at a temperature of 682 C. Thus, the heat exchanger efficiency is 51.6% in Case 2. As a result, specific fuel consumption is reduced to 2.84 GJ/t, providing 19.3% fuel savings relative to the Oxy-$CH_4$ baseline. Case 4 shows the same furnace is fired with hydrogen ($H_2$) and with the same TCR heat recovery system without RFG. $H_2$ is simply heated in the TCR without chemical reactions. The heat transfer analysis of TCR for $H_2$ preheating shows that 42% of the sensible heat in the flue gas is transferred to the fuel (i.e., $H_2$) and recycled to the furnace as the sensible heat of hydrogen at 1200° C. As a result, fuel consumption is reduced to 2.89 GJ/t, providing 17.9% fuel savings relative to the Oxy-$CH_4$ baseline (Case 1).

In accordance with the principles of the present invention, when $CH_4$ and $H_2$ are blended and the fuel mixture is used in the furnace with the same TCR as the heat recovery system, the heat recovery efficiency (or heat exchanger efficiency) from the flue gas to the fuel mixture improves significantly due to a synergistic effect of the fuel mixture for heat transfer in the TCR. Cases 5, 6 and 7 show mixing of $H_2$ and $CH_4$ at 75%-25%, 50%-50%, and 75%-25% by volume respectively. They correspond to % heat input in lower heating value (LHV) by $H_2$ of 47.5, 21.3, and 9.1% respectively. The model shows that heat exchanger efficiency increases to 54.8%, 53.5% and 52.5% for case numbers 5, 6 and 7, respectively, which are meaningfully higher than fuel input weighted average heat exchanger efficiencies of 47.0%, 49.4% and 50.7% for case numbers 5, 6 and 7, respectively. All three cases show heat exchanger efficiencies higher than that of $CH_4$ (baseline Case number 1) and also that of $H_2$ (Case number 4). "Fuel input weighted average heat exchanger efficiencies" as used herein and throughout means the average heat exchanger efficiency calculated by the heat exchanger efficiency achieved when the first fuel f1 alone is used in the furnace under specified production conditions with the same heat exchanger as used in the present invention multiplied by the fuel input fraction in lower heating value (LHV) of the first fuel plus the heat exchanger efficiency achieved when the second fuel f2 alone is used in the furnace, under the same production conditions, with the same heat exchanger as used in the present invention multiplied by the fuel input fraction in lower heating value (LHV) of the second fuel. As a result of the higher heat recovery achieved in case numbers 5, 6 and 7, the fuel consumption in the furnace is reduced in each of cases 5, 6 and 7. In the normal operation of a counter-flow heat exchanger without endothermic chemical reactions, the expected heat exchanger efficiency becomes the fuel input weighted average of the heat exchanger efficiencies of two different fuels used separately. In the following sections, more examples are provided to illustrate exemplary methods for achieving the synergistic benefits in accordance with the principles of the present invention. As shown in Table 1 for cases 5, 6 and 7, the present inventor unexpectedly found that blending of a first fuel (f1) that can undergo endothermic chemical reactions with a second fuel (f2) that does not react endothermically improves the overall heat recovery efficiency to a higher value than the fuel input weighted average heat exchanger efficiency of f1 and f2.

TABLE 1

Fuel Consumption and TCR Heat Exchanger Efficiency for $CH_4$, $H_2$ and Their Mixtures as calculated.

| | CASE NUMBER | | | | | | |
| | 1 Oxy-$CH_4$ | 2 $CH_4$-TCR | 3 Oxy-$H_2$ | 4 $H_2$-TCR | 5 OXY-TCR (Invention) | 6 OXY-TCR (Invention) | 7 OXY-TCR (Invention) |
|---|---|---|---|---|---|---|---|
| $H_2$ % (VOL) in H2-NATURAL GAS MIXTURE | 0 | 0 | 100 | 100 | 75.0 | 50.0 | 25.0 |
| $H_2$ % (LHV) in H2-NATURAL GAS MIXTURE | 0 | 0 | 100 | 100 | 47.5 | 23.1 | 9.1 |
| FUEL CONSUMPTION (GJ LHV/T) | 3.52 | 2.84 | 3.53 | 2.89 | 2.82 | 2.83 | 2.83 |
| FUEL SAVINGS | Base | 19.3% | −0.3% | 17.9% | 19.9% | 19.7% | 19.5% |
| HEAT EXCHANGER RECOVERY EFFICIENCY | | 51.6% | | 42.0% | 54.8% | 53.5% | 52.5% |
| FUEL INPUT WEIGHTED AVERAGE HEAT EXCHANGER RECOVERY EFFICIENCY | | 51.6% | | 42.0% | 47.0% | 49.4% | 50.7% |

The synergistical effect of blending at least two different fuels f1 and f2 of complementary characteristic to enhance the heat recovery efficiency from the sensible heat of combustion flue gas products is further explained below by using four different fuel species ($CH_4$, $H_2$, $NH_3$ and $C_2H_5OH$). The fuel mixture ("FM") consists of first fuel ("f1") and second fuel ("f2") in the following examples. In the general combustion process, fuel and oxidant, each containing various species, are mixed to generate heat and gaseous combustion products (flue gas) containing $H_2O$, $CO_2$, $N_2$, excess $O_2$ and other minor components. In the following examples, the combustion of fuel (FM, f1 or f2) and pure oxygen at the stoichiometric ratio generating gaseous combustion products consisting only of $H_2O$, $CO_2$, and $N_2$ are considered for illustrative purposes. The heat exchanger system is either a recuperator or regenerators and has a low temperature zone ("LTZ") and a high temperature zone ("HTZ") where endothermic chemical reactions take place. F1, which may or may not contain recycle flue gas (RFG), is heated without significant chemical changes in the low temperature zone of the heat exchanger, and further heated and reacts endothermically in the HTZ of the heat exchanger. Since the mass flow rate of the combustion flue gas is always larger than that of fuel mixture in combustion, the heat capacity rate of f1 is lower than that of the flue gas in LTZ. The effective heat capacity rate of f1 in HTZ is greater than the heat capacity rate of the flue gas in HTZ generated from combustion of f1 and oxygen in the furnace. The effective heat capacity rate is defined as the enthalpy change of f1 which includes both thermal and chemical energy in HTZ divided by the temperature change of f1 in HTZ. The temperature that divides LTZ and HTZ depends on the characteristics of fuel f1 and the heat exchanger design including use of catalyst, heat transfer surface area and gas residence time. In the following examples, the heat exchanger is regenerators without catalyst as depicted in FIGS. 2-4 and 900° C. is the zone dividing temperature for $CH_4$ and other fuels. When catalysts are used, the zone dividing temperature may be reduced, for example, to 700° C., or to 500° C., with the exact temperature depending on the type of catalyst and the heat exchanger design.

The following assumptions are used to numerically illustrate the synergistic effect of fuel blending. The fuel stream enters the low temperature zone of a heat exchanger at 25° C. and is heated to 900° C. It is heated further in the high temperature zone of the heat exchanger to 1200° C. The flue gas stream enters countercurrently into the heat exchanger of the high temperature zone at 1445° C. and is cooled to 954° C. It is cooled further in the low temperature zone. The enthalpy available in the flue gas for potential heat recovery in LTZ is calculated by assuming that the flue gas is cooled from 954° C. to 25° C. The actual temperature of the flue gas stream at the exit of the heat exchanger is higher than 25° C. and determined by the heat exchanger design and limited by the heat capacity rate ratio of fuel stream (FM) to the flue gas. The heat recovery potential in each zone is defined as the enthalpy change of the fuel stream divide by the available enthalpy of the flue gas in each temperature zone. The actual overall heat recovery efficiency from the flue gas is defined as the actual enthalpy change of the flue gas minus wall heat losses in the heat exchanger divided by the enthalpy of the flue gas entering the heat exchanger. The actual enthalpy change of the flue gas minus wall heat losses is the actual heat transferred to the fuel stream in the heat exchanger. In the following examples, the wall heat losses are assumed to be zero. Table 2 shows calculated heat recovery potentials in LTZ and HTZ.

TABLE 2

Heat recovery potentials for different fuels from oxy-fuel combustion flue gas

| Case number | Fuel Stream | LTZ (25-900° C.) | HTZ (900-1200° C.) | Assumed Reactions |
|---|---|---|---|---|
| 1 | $CH_4$ | 44% | 156% | $CH_4 \rightarrow C + 2H_2$ (>900° C.) |
| 2 | $CH_4$ with RFG | 56% | 464% | $CH_4 + (CO_2 + 2H_2O)/3 \rightarrow$ (4CO + 16$H_2$)/3 (>900° C.) |
| 3 | $H_2$ | 73% | 42% | none |
| 4 | $NH_3$ | 63% | 175% | $NH_3 \rightarrow 0.5N_2 + 1.5H_2$ (>900° C.) |
| 5 | $C_2H_5OH(l)$ | 73% | 71% | $C_2H_2OH(l) \rightarrow C_2H_5OH(g)$ (<900° C.) $C_2H_5OH(g) \rightarrow C_2H_4 +$ $H_2O$ (>900° C.) |

Case number 1 shows pure methane ($CH_4$) as the low temperature fuel stream. The gaseous combustion products (flue gas) consist of $CO_2 + 2\ H_2O$ generated from stoichiometric combustion with pure oxygen in a furnace. In the low temperature zone, the enthalpy (i.e., sensible heat) increase of methane is 44% of the enthalpy available in the flue gas in this zone. It shows that the flue gas stream cannot be cooled down below the 56% of the enthalpy level of the flue gas entering the low temperature zone at 954° C. In the high temperature zone (HTZ), methane is assumed to be fully converted to form pure carbon and hydrogen. The enthalpy change of the fuel stream includes both endothermic heat of the cracking reaction and the sensible heat. The heat recovery potential in this zone is 156% by this definition, which means that the fuel gas stream can potentially recover more heat than available in the flue gas stream in the HTZ. Conversely, it also means that the flue gas stream itself does not have sufficient heat in the high temperature zone (HTZ) to complete the endothermic reactions of the fuel stream.

Case 2 shows methane mixed with recycled flue gas at a 1:1 mole ratio as the low temperature fuel stream. The fuel stream consists of $CH_4 + \frac{1}{3}(CO_2 + 2\ H_2O)$ and the flue gas consists of $\frac{4}{3}(CO_2 + 2\ H_2O)$, generated from stoichiometric combustion with pure oxygen. Heat recovery potentials calculated are 56% in LTZ and 377% in HTZ. The very high heat recovery potential of 377% shows only a small fraction of the fuel stream can actually complete the assumed reforming reactions. Cases 3, 4 and 5 show the heat recovery potentials of hydrogen, ammonia and ethanol, which are considered as important green fuels of future to reduce $CO_2$ emissions from combustion. In Case 3 the flue gas stream becomes pure water vapor and $H_2$ is heated to 1200° C. without any chemical reactions. The heat recovery potentials are 73% in LTZ and 42% in HTZ. Heat recovery potentials of ammonia are 63% in LTZ and 175% in HTZ due to the endothermic dissociation reactions of $NH_3$ to form 0.5 mole of $N_2$ and 1.5 moles of $H_2$. Ethanol is a liquid fuel with a low boiling point of 173.1° F. (78.4° C.) at atmospheric pressure. It physically transforms from liquid to gas in the LTZ. It requires a significant latent heat of evaporation in the LTZ, which contributes to the high heat recovery potential in the LTZ. In the HTZ, ethanol is assumed to decompose to ethylene and water vapor. Heat recovery potentials of ethanol are 73% in LTZ and 71% in HTZ based on these assumptions. In summary, and as will be further described hereinbelow, the calculated results of Table 2 indicate that suitable first fuels (f1) for use in the present invention are CH4, CH4 with RFG, and NH3 due to each of said fuels exhibiting greater than 100% HRP in the HTZ.

The inventor has discovered that a key requirement to achieve the enhanced heat recovery efficiency of the present invention as shown in Table 1 by mixing two or more fuels is to increase the heat recovery in the LTZ while maintaining the average heat recovery potential in the HTZ near or above 100% after mixing the fuels. Thus, the calculations illustrate that f2 must have higher heat recovery potential than f1 in LTZ and f1 preferably has a heat recovery potential in the HTZ of greater than 110%, and more preferably greater than 150%. The approximate mixture ranges to increase the overall heat recovery efficiency above the weighted average heat recovery efficiency can be estimated by the potential heat recovery efficiency calculations. In Table 3, examples of the peak fuel mixing ratio ("Peak f2% by vol") to increase the heat recovery potential in the LTZ while maintaining the heat recovery potential at 100% in the HTZ are shown. Projected Heat recovery efficiencies (HRE) were calculated and compared with the fuel input weighted average heat recovery efficiencies (WA HRE), each of which is shown in the last two columns, respectively. Significant increases in the HRE are shown as compared with the WA HRE for each pairing of f1 and f2 in Table 3. When mixing of the second fuel (f2) is increased above the peak f2%, the overall heat recovery efficiency starts to decrease as the heat recovery potential in HTZ is reduced more sharply in comparison to the gradual increase of the heat recovery potential in LTZ. Nonetheless, in each such instance, the Projected heat recovery efficiency still remains above the fuel input weighted average heat recovery efficiency, typically by about additional 5-10% beyond the peak f2% (not shown in the tables).

TABLE 3

Peak fuel mixing ratios (f2 %), heat recovery potentials (HRP) in LTZ and HTZ, Projected
Heat Recovery Efficiency (HRE), and Weighted Average Heat Recovery (WA HRE)

| Fuel 1 (f1) | Fuel 2 (f2) | Peak f2 % (by vol) | Peak f2 % (by LHV) | HRP in LTZ (%) | HRP in HTZ (%) | Projected HRE (%) | WA HRE (%) |
|---|---|---|---|---|---|---|---|
| $CH_4$ | $H_2$ | 76% | 49% | 58% | 100% | 74.4% | 55.2% |
| $CH_4$ + RFG | $H_2$ | 91% | 86% | 70% | 100% | 82.0% | 48.2% |
| $NH_3$ | $H_2$ | 63% | 56% | 68% | 100% | 80.6% | 58.5% |
| $CH_4$ | $C_2H_5OH(l)$ | 57% | 66% | 63% | 100% | 77.4% | 69.9% |
| $CH_4$ + RFG | $C_2H_5OH(l)$ | 81% | 93% | 72% | 100% | 82.6% | 72.1% |
| $NH_3$ | $C_2H_5OH(l)$ | 41% | 72% | 70% | 100% | 81.6% | 73.4% |

The examples shown in Tables 2 and 3 are based on the pure flue gas generated from the combustion of the fuel and pure oxygen without additional process generated gases. Actual flue gas flow from industrial furnaces such as a glass melting furnace contains significant air infiltration into the furnace, and water vapor and carbon dioxides gases generated from batch materials during melting. These process generated gases are mixed in the gaseous combustion products and exit the furnace as the furnace flue gas. The peak fuel mixing ratio is reduced when the flue gas flow contains additional gases in addition to the combustion generated gases. Tables 4 and 5 show changes in the heat recovery potentials, the peak fuel mixing ratios, and heat recovery efficiencies for a typical oxy-fuel fired 300 tpd container glass furnace operating at 50% cullet ratio, respectively.

TABLE 4

Heat recovery potentials for different fuels for flue
gas from oxy-fuel fired 300 tpd container glass furnace

| Case no. | Fuel Stream | HRP in LTZ (%) (25-900° C.) | HRP in HTZ (%) (900-1200° C.) | Assumed Reactions |
|---|---|---|---|---|
| 1 | $CH_4$ | 31% | 112% | $CH_4 -> C + 2H_2$ (>900° C.) |
| 2 | $CH_4$ with RFG | 43% | 355% | $CH_4 + (CO_2 + 2H_2O)/3 ->$ $(4CO + 16H_2)/3$ (>900° C.) |
| 3 | $H_2$ | 52% | 30% | none |
| 4 | NH3 | 51% | 144% | $NH_3 -> 0.5N_2 + 1.5H_2$ (>900° C.) |
| 5 | $C_2H_5OH(l)$ | 54% | 54% | $C_2H_2OH(l) -> C_2H_5OH(g)$ (<900° C.) $C_2H_5OH(g) -> C_2H_4 +$ $H_2O$ (>900° C.) |

30

TABLE 5

Peak fuel mixing ratios (f2 %), heat recovery potentials (HRP) in LTZ and HTZ,
Projected Heat Recovery Efficiency (HRE), and Weighted Average Heat Recovery
Efficiency (WA HRE) for oxy-fuel fired 300 tpd container glass furnace

| Fuel 1 (f1) | Fuel 2 (f2) | Peak f2 % (by vol) | Peak f2 % (by LHV) | HRP in LTZ (%) | HRP in HTZ (%) | Projected HRE (%) | WA HRE (%) |
|---|---|---|---|---|---|---|---|
| $CH_4$ | $H_2$ | 37% | 15% | 34% | 100% | 61.6% | 57.4% |
| $CH_4$ + RFG | $H_2$ | 86% | 79% | 50% | 100% | 70.4% | 48.0% |
| $NH_3$ | $H_2$ | 46% | 39% | 51% | 100% | 70.7% | 59.6% |
| $CH_4$ | $C_2H_5OH(l)$ | 15% | 21% | 36% | 100% | 62.3% | 58.6% |
| $CH_4$ + RFG | $C_2H_5OH(l)$ | 65% | 85% | 53% | 100% | 70.8% | 55.8% |
| $NH_3$ | $C_2H_5OH(l)$ | 20% | 49% | 53% | 100% | 70.9% | 62.1% |

Table 4 shows reduced heat recovery potentials of every fuels as compared to those in Table 2 because of additional process gases generated in the glass furnace and mixed in the gaseous combustion products from the furnace. At the peak fuel f2 mixture % projected heat recovery efficiencies (HRE) are significantly higher than the weighted average heat recovery efficiencies (WA HRE) in both Table 3 and Table 5, thereby demonstrating the unexpected results of the present invention when utilizing a mixture of certain f1 and f2 fuels having certain HRP characteristics int eh LTZ and HTZ as has been described in detail hereinabove.

As mentioned previously, the peak mixing ratios shown in Table 3 and Table 5 provide engineering estimates close to the maximum overall heat recovery efficiencies. Actual endothermic reactions of hydrocarbon fuels are more complex than the simple idealized reactions shown in Table 2 and the degree of endothermic reactions occur in the heat exchanger depends on the heat exchanger design and temperature in the HTZ. Thus, the actual peak mixing ratios may deviate from the examples shown in Tables 3 and 5, but still impart the benefits of enhanced heat recovery.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed. For example, although not included in the above examples, low heating value bio-fuels can be a suitable blending fuel as the second fuel f2. Liquid raw bio-fuels such as ethanol produced from corn or sugarcane fermentation or bio-oils from pyrolysis of biomass materials contain large water fractions and have large heat recovery potentials in the LTZ due to the heat of water evaporation. By blending with a higher quality fuel like natural gas significant improvements in the heat recovery efficiencies over the fuel-input weighted average heat exchanger efficiency of the fuel mixture are expected in accordance with the principles of the present invention.

What is claimed is:

1. A method of operating a furnace at a specified production rate, comprising (A) producing gaseous combustion products by combusting in the furnace a fuel product, wherein the fuel product is produced in a heat exchanger by (B) (i) feeding into the heat exchanger a fuel mixture which comprises an amount of a first fuel and an amount of a second fuel, and (ii) endothermically reacting the fuel mixture in the heat exchanger to form the fuel product, and (iii) passing said gaseous combustion products from the furnace into and through the heat exchanger to provide heat to the endothermic reaction that forms the fuel product; and (C) feeding the fuel product from the heat exchanger into the furnace to be combusted, under conditions to maintain the specified production rate wherein the amount of heat transferred in the heat exchanger from the gaseous combustion products to the fuel mixture relative to the amount of heat contained in the gaseous combustion products is higher than a fuel input weighted average heat exchanger efficiency of the fuel mixture.

2. A method according to claim 1, wherein said first fuel comprises natural gas or a mixture of natural gas and a portion of said gaseous combustion products that is cooled prior to entering into the heat exchanger, and said second fuel comprises hydrogen, ammonia, ethanol, or biomass pyrolysis oil.

3. A method according to claim 1, wherein said first fuel comprises natural gas or a mixture of natural gas and a portion of said gaseous combustion products that is cooled prior to entering into the heat exchanger, and said second fuel comprises biomass derived fuel containing water.

4. A method according to claim 1, wherein the first fuel comprises ammonia, and the second fuel comprises hydrogen, ethanol, or biomass pyrolysis oil.

5. A method according to claim 1, wherein said heat exchanger is a thermochemical regenerator.

6. A method according to claim 1, wherein the temperature of said gaseous combustion products is above 1000° C.

7. A method according to claim 1, wherein said fuel product is combusted in said furnace with oxidant comprising at least 50 vol. % oxygen.

8. A method according to claim 1, wherein said furnace is a glass melting furnace.

9. A method according to claim 1, wherein said furnace is co-fired with other burners, wherein each of said other burners uses a corresponding fuel that is different from said fuel product.

10. A method of carrying out combustion in a furnace, comprising (A) combusting a fuel product in a furnace to produce gaseous combustion products, and (B) passing the gaseous combustion products from the furnace into a heat exchanger to transfer heat from said gaseous combustion products to a fuel mixture comprising (i) a first fuel that undergoes endothermic reactions with a heat recovery potential above 900° C. of greater than 100% and (ii) a second fuel that has a larger heat recovery potential below 900° C. than that of the first fuel, thereby cooling said gaseous combustion products and heating said fuel mixture to form said fuel product, and passing said fuel product into the furnace and combusting said fuel product in the furnace.

11. A method according to claim 10, wherein said fuel mixture has a heat recovery potential above 900° C. of greater than 100%.

12. A method according to claim 10, wherein the first fuel comprises natural gas or a mixture of natural gas and a portion of said gaseous combustion products that is cooled prior to entering into the heat exchanger and the second fuel comprises hydrogen, ammonia, ethanol, or biomass pyrolysis oil.

13. A method according to claim 10 wherein the first fuel comprises natural gas or mixture of natural gas and a portion of said gaseous combustion products that is cooled prior to entering into the heat exchanger, and the second fuel comprises biomass derived fuel containing water.

14. A method according to claim 10, wherein the first fuel comprises ammonia, and the second fuel contain hydrogen, ethanol, or biomass pyrolysis oil.

15. A method according to claim 10, wherein said heat exchanger is a thermochemical regenerator.

16. A method according to claim 10, wherein the temperature of said gaseous combustion products is above 1000° C.

17. A method according to claim 10, wherein said fuel product is combusted in said furnace with an oxidant comprising at least 50 vol. % oxygen.

18. A method of carrying out combustion in a furnace, comprising (A) combusting a fuel product in a furnace to produce gaseous combustion products, and (B) alternately (1) passing the gaseous combustion products from the furnace into and through a cooled first regenerator to heat the first regenerator and cool said gaseous combustion products, and passing a fuel mixture comprising (i) one or more compounds that cannot react endothermically at a temperature below 1500 C and (ii) one or more compounds that can react endothermically at a temperature below 1500 C, into a heated second regenerator heated in step (2) and, in the second regenerator, heating said one or more compounds that cannot react endothermically at a temperature below 1500 C and said one or more compounds that can react endothermically at a temperature below 1500 C to form said fuel product comprising hydrogen, thereby cooling said second regenerator, and passing said fuel product from the second regenerator into the furnace and combusting the fuel product in the furnace, and (2) passing the gaseous combustion products from the furnace into and through said second regenerator cooled in step (1) to heat the second regenerator and cool said gaseous combustion products, and passing a fuel mixture comprising a mixture of (i) one or more compounds that cannot react endothermically at a temperature below 1500 C and (ii) one or more compounds that can react endothermically at a temperature below 1500 C, into said first regenerator heated in step (1) and, in the first regenerator, heating said one or more compounds that cannot react endothermically at a temperature below 1500 C and said one or more compounds that can react endothermically at a temperature below 1500 C, wherein the one or more of said compounds that can react endothermically at a temperature below 1500 C reacts in an endothermic reaction to form said fuel product comprising hydrogen, and passing said fuel product from the first regenerator into the furnace and combusting the fuel product in the furnace.

19. A method according to claim 18, wherein said one or more compounds that cannot react endothermically at a temperature below 1500 C has a higher heat recovery potential in a temperature range below 900C than said one or more compounds that can react endothermically at a temperature below 1500 C.

20. A method according to claim 18, wherein said one or more compounds that cannot react endothermically at a temperature below 1500 C comprises hydrogen or carbon monoxide or both.

21. A method according to claim 18, wherein said one or more compounds that can react endothermically at a temperature below 1500 C has a heat recovery potential greater than 100%.

22. A method according to claim 18, wherein said one or more compounds that can react endothermically at a temperature below 1500 C are selected from the group consisting of natural gas, saturated and unsaturated hydrocarbons containing 1 to 10 carbon atoms, NH3, H2S, and mixtures thereof.

23. A method according to claim 18, wherein said fuel mixture fed to said second regenerator further comprises gaseous combustion products from said furnace that have passed through said first regenerator and said fuel mixture fed to said first regenerator further comprises gaseous combustion products from said furnace that have passed through said second regenerator.

24. A method according to claim 18, wherein said fuel product is combusted in said furnace with an oxidant comprising at least 50 vol. % oxygen.

25. A method according to claim 18, wherein said fuel product is combusted in said furnace with an oxidant comprising at least 90 vol. % oxygen.

26. A method according to claim 18, wherein said fuel mixture comprises natural gas.

* * * * *